United States Patent
Chu et al.

(10) Patent No.: US 10,256,961 B2
(45) Date of Patent: Apr. 9, 2019

(54) ACKNOWLEDGMENT OF UPLINK ORTHOGONAL FREQUENCY DIVISION MULTIPLE ACCESS TRANSMISSION

(71) Applicant: Marvell World Trade Ltd., St. Michael (BB)

(72) Inventors: Liwen Chu, San Ramon, CA (US); Lei Wang, San Diego, CA (US); Hongyuan Zhang, Fremont, CA (US); Yakun Sun, Sunnyvale, CA (US); Jinjing Jiang, San Jose, CA (US); Hui-Ling Lou, Sunnyvale, CA (US)

(73) Assignee: Marvell World Trade Ltd., St. Michael (BB)

( * ) Notice: Subject to any disclaimer, the term of this patent is extended or adjusted under 35 U.S.C. 154(b) by 132 days.

(21) Appl. No.: 15/332,548

(22) Filed: Oct. 24, 2016

(65) Prior Publication Data

US 2017/0118000 A1    Apr. 27, 2017

Related U.S. Application Data

(60) Provisional application No. 62/245,684, filed on Oct. 23, 2015.

(51) Int. Cl.
*H04L 5/00* (2006.01)
*H04W 72/04* (2009.01)
(Continued)

(52) U.S. Cl.
CPC .......... *H04L 5/0055* (2013.01); *H04L 1/1685* (2013.01); *H04L 1/1854* (2013.01);
(Continued)

(58) Field of Classification Search
CPC ..... H04L 5/0055; H04L 5/0007; H04L 5/003; H04L 1/1621; H04L 1/1685; H04L 1/1854; H04L 1/1896; H04W 72/0446
See application file for complete search history.

(56) References Cited

U.S. PATENT DOCUMENTS 9,853,734 B1* 12/2017 Fan .................. H04B 10/40
9,853,794 B2* 12/2017 Wentink ............ H04L 5/0055
(Continued)

FOREIGN PATENT DOCUMENTS

EP    2 226 958    9/2010

OTHER PUBLICATIONS

International Search Report and Written Opinion in International Patent Application No. PCT/US2016/058459, dated Mar. 21, 2017 (23 pages).
(Continued)

*Primary Examiner* — Asad M Nawaz
*Assistant Examiner* — Thomas R Cairns

(57) ABSTRACT

A first communication device receives an uplink orthogonal frequency multiple access (OFDMA) transmission. The uplink OFDMA transmission includes respective transmissions from multiple second communication devices, and the respective transmissions from the multiple second communication devices include indications of respective acknowledgment policies corresponding to the respective transmissions from the multiple second communication devices. The first communication device generates one or more acknowledgment physical layer (PHY) data units to acknowledge at least a portion of the uplink OFDMA transmission, where the one or more acknowledgment PHY data units do not comply with at least one of the acknowledgment policies corresponding to the uplink OFDMA transmission. The first communication device transmits the one or more acknowledgment PHY data units to acknowledge the at least the portion of the uplink OFDMA transmission.

18 Claims, 9 Drawing Sheets

(51) Int. Cl.
  H04L 1/16       (2006.01)
  H04L 1/18       (2006.01)
(52) U.S. Cl.
  CPC .......... *H04L 1/1896* (2013.01); *H04L 5/003* (2013.01); *H04L 5/0007* (2013.01); *H04W 72/0446* (2013.01); *H04L 1/1621* (2013.01)

(56) References Cited

U.S. PATENT DOCUMENTS

| | | | | |
|---|---|---|---|---|
| 9,942,055 | B2* | 4/2018 | Huang | .................. H04L 12/189 |
| 2013/0229996 | A1 | 9/2013 | Wang et al. | |
| 2015/0063111 | A1 | 3/2015 | Merlin et al. | |
| 2015/0131517 | A1 | 5/2015 | Chu et al. | |
| 2018/0034595 | A1* | 2/2018 | Kim | ...................... H04L 1/1671 |

OTHER PUBLICATIONS

International Preliminary Report on Patentability in International Patent Application No. PCT/US2016/058459, dated May 3, 2018 (15 pages).
IEEE Std 802.11ac/D7.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-456 (Sep. 2013).
IEEE P802.11ax™/D0.1, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for high efficiency in frequency bands between 1 GHz and 6 GHz," IEEE Computer Society, 221 pages (Mar. 2016).
IEEE P802.11ax™/D0.4, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN," IEEE Computer Society, 317 pages (Aug. 2016).
IEEE P802.11ax™/D0.5, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN (#1121)," IEEE Computer Society, 376 pages (Sep. 2016).
IEEE Std 802.11-REVmc™/D8.0 (revision of IEEE Std. 802.11™—2012) "Draft Standard for Information technology—Telecommunications and information exchange between systems—Local and metropolitan area networks—Specific requirements" Part 11: Wireless LAN Medium Access Control (MAC) and Physical Layer (PHY) Specifications, The Institute of Electrical and Electronics Engineers, Inc., 3774 pages (Aug. 2016).
IEEE Std 802.11™ 2012 (Revision of IEEE Std 802.11—2007) IEEE Standard for Information technology—Telecommunications and information exchange between systems—Local and metropolitan area networks—Specific requirements Part 11: Wireless LAN Medium Access Control (MAC) and Physical Layer (PHY) specifications, The Institute of Electrical and Electronics Engineers, Inc., pp. 1-2695 (Mar. 29, 2012).
IEEE Std 802.16™—2012 (Revision of IEEE Std. 802.16—2009), IEEE Standard for Air Interface for Broadband Wireless Access Systems: Part 1—Beginning through Section 7, IEEE Computer Society and the IEEE Microwave Theory and Techniques Society, *The Institute of Electrical and Electronics Engineers, Inc.*, 2558 pages (Aug. 17, 2012).
Stacey et al., "IEEE P802.11, Wireless LANs, Proposed TGac Draft Amendment," Institute of Electrical and Electronics Engineers, doc. No. IEEE 802.11-10/1361r3 pp. 1-154 (Jan. 2011).
Stacey et al., "Specification Framework for TGac," document No. IEEE 802.11-09/0992r20, *Institute for Electrical and Electronics Engineers*, pp. 1-49, (Jan. 18, 2011).
Tandai et al., "An Efficient Uplink Multiuser MIMO Protocol in IEEE 802.11 WLANs," IEEE 20th International Symposium on Personal, Indoor and Mobile Radio Communications (PIMRC 2009), pp. 1153-1157 (Sep. 13, 2009).
Invitation to Pay Additional Fees and Partial International Search Report in International Patent Application No. PCT/US2016/058459, dated Jan. 31, 2017 (9 pages).

* cited by examiner

PRIOR ART

ACKNOWLEDGMENT OF UPLINK ORTHOGONAL FREQUENCY DIVISION MULTIPLE ACCESS TRANSMISSION

CROSS-REFERENCE TO RELATED APPLICATION

This application claims the benefit of U.S. Provisional Application No. 62/245,684, filed Oct. 23, 2015, entitled "ACK Policy in UL OFDMA," which is hereby incorporated by reference herein in its entirety.

FIELD OF THE DISCLOSURE

The present disclosure relates generally to communication networks and, more particularly, to acknowledging an uplink multi-user transmission in a wireless local area network (WLAN).

BACKGROUND

Wireless local area network (WLAN) technology has evolved rapidly over the past two decades. Development of WLAN standards such as the Institute for Electrical and Electronics Engineers (IEEE) 802.11a, 802.11b, 802.11g, 802.11n, and 802.11ac Standards has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.11ac Standard specifies a single-user peak throughput in the gigabits per second (Gbps) range. Future standards promise to provide even greater throughput, such as throughputs in the tens of Gbps range.

SUMMARY

In an embodiment, a method for communicating in a wireless communication network includes: receiving, at the first communication device, an uplink orthogonal frequency multiple access (OFDMA) transmission, wherein the uplink OFDMA transmission includes respective transmissions from the multiple second communication devices, wherein the respective transmissions from the multiple second communication devices include indications of respective acknowledgment policies corresponding to the respective transmissions from the multiple second communication devices; generating, at the first communication device, one or more acknowledgment physical layer (PHY) data units to acknowledge at least a portion of the uplink OFDMA transmission, wherein the one or more acknowledgment PHY data units do not comply with at least one of the acknowledgment policies corresponding to the uplink OFDMA transmission; and transmitting, with the first communication device, the one or more acknowledgment PHY data units to acknowledge the at least the portion of the uplink OFDMA transmission.

In another embodiment, an apparatus comprises a network interface device associated with a first communication device. The network interface device includes one or more integrated circuits configured to: receive an uplink orthogonal frequency multiple access (OFDMA) transmission, wherein the uplink OFDMA transmission includes respective transmissions from multiple second communication devices, wherein the respective transmissions from the multiple second communication devices include indications of respective acknowledgment policies corresponding to the respective transmissions from the multiple second communication devices; generate one or more OFDMA acknowledgment physical layer (PHY) data units to acknowledge at least a portion of the uplink OFDMA transmission, wherein the one or more OFDMA acknowledgment PHY data units do not comply with at least one of the acknowledgment policies corresponding to the uplink OFDMA transmission; and cause the first communication device to transmit the one or more OFDMA acknowledgment PHY data units to acknowledge the at least the portion of the uplink OFDMA transmission.

DETAILED DESCRIPTION

In embodiments described below, a wireless network device such as an access point (AP) of a wireless local area network (WLAN) transmits and receives data streams to/from one or more client stations. In some embodiments, the AP and the client stations utilize one or more multi-user (MU) modes in which multiple independent data streams are transmitted simultaneously to/from multiple client stations. MU transmission to, or by, multiple client stations is performed using MU multiple input multiple output (MU-MIMO) transmission in which respective spatial streams are used for transmission to, or by, respective ones of the multiple client stations, and/or using orthogonal frequency division multiple access (OFDMA) transmission in which respective frequency sub-channels of a communication channel are used for simultaneous transmission to, or by, respective ones of multiple client stations, in various embodiments. In some embodiments, a downlink trigger frame transmitted by the AP triggers an uplink MU transmission from the client stations. In some embodiments, in response to receiving an uplink MU transmission from the client stations, the AP transmits one or more acknowledgement frames via MU downlink transmission.

Figure 1:
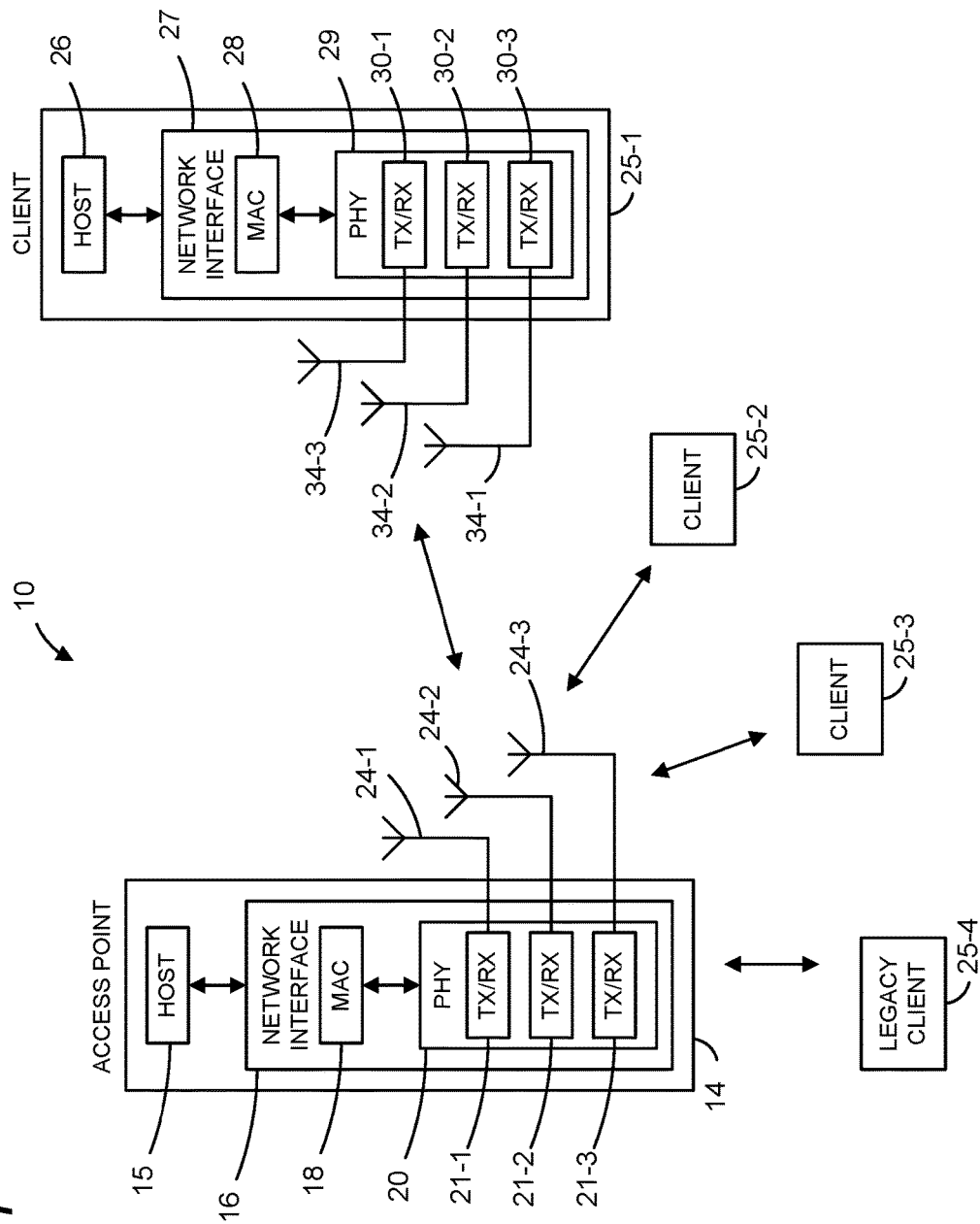
FIG. 1 is a block diagram of an example wireless local area network (WLAN), according to an embodiment.

FIG. 1 is a block diagram of an example wireless local area network (WLAN) 10, according to an embodiment. The WLAN 10 supports downlink (DL) and uplink (UL) single-user (SU) communication between an access point (AP) and each of a plurality of client stations. In an embodiment, the WLAN 10 also supports DL and/or UL orthogonal frequency division multiple access (OFDMA) communication between the AP and at least some of the client stations. In some embodiments, the WLAN 10 additionally or alternatively supports DL and/or UL multiuser (MU) multiple-input and multiple-output (MIMO) communication between the AP and at least some of the client stations.

The WLAN 10 includes an AP 14, and the AP 14, in turn, includes a host processor 15 coupled to a network interface device 16. The network interface device 16 includes a medium access control (MAC) processing unit 18 and a physical layer (PHY) processing unit 20. The PHY processing unit 20 includes a plurality of transceivers 21, and the transceivers 21 are coupled to a plurality of antennas 24. Although three transceivers 21 and three antennas 24 are illustrated in FIG. 1, the AP 14 includes other suitable numbers (e.g., 1, 2, 4, 5, etc.) of transceivers 21 and antennas 24 in other embodiments. In an embodiment, the network interface device 16 includes one or more integrated circuit (IC) devices. For example, at least some of the functionality of the MAC processing unit 18 and at least some of the functionality of the PHY processing unit 20 are implemented on a single IC device, according to an embodiment. As another example, at least some of the functionality of the MAC processing unit 18 is implemented on a first IC device, and at least some of the functionality of the PHY processing unit 20 is implemented on a second IC device, according to an embodiment.

The WLAN 10 includes a plurality of client stations 25. Although four client stations 25 are illustrated in FIG. 1, the WLAN 10 includes other suitable numbers (e.g., 1, 2, 3, 5, 6, etc.) of client stations 25 in various scenarios and embodiments. The client station 25-1 includes a host processor 26 coupled to a network interface device 27. The network interface device 27 includes a MAC processing unit 28 and a PHY processing unit 29. The PHY processing unit 29 includes a plurality of transceivers 30, and the transceivers 30 are coupled to a plurality of antennas 34. Although three transceivers 30 and three antennas 34 are illustrated in FIG. 1, the client station 25-1 includes other suitable numbers (e.g., 1, 2, 4, 5, etc.) of transceivers 30 and antennas 34 in other embodiments. In an embodiment, the network interface device 27 includes one or more IC devices. For example, at least some of the functionality of the MAC processing unit 28 and at least some of the functionality of the PHY processing unit 29 are implemented on a single IC device, according to an embodiment. As another example, at least some of the functionality of the MAC processing unit 28 is implemented on a first IC device, and at least some of the functionality of the PHY processing unit 29 is implemented on a second IC device, according to an embodiment.

In an embodiment, one or more of the client stations 25-2, 25-3, and 25-4 has a structure the same as or similar to the client station 25-1. In these embodiments, the client stations 25 structured the same as or similar to the client station 25-1 have the same or different numbers of transceivers and antennas. For example, the client station 25-2 has only two transceivers and two antennas (not shown), according to an embodiment.

In various embodiments, the PHY processing unit 20 of the AP 14 is configured to generate downlink data units having formats described herein. The transceiver(s) 21 is/are configured to transmit the generated data units via the antenna(s) 24. Similarly, the transceiver(s) 21 is/are configured to receive the data units via the antenna(s) 24. The PHY processing unit 20 of the AP 14 is configured to process received uplink data units having formats described herein, according to various embodiments.

In various embodiments, PHY processing units of the client stations 25 (e.g., the PHY processing unit 29 of the client device 25-1) are configured to generate uplink data units having formats described herein. The transceiver(s) 30 is/are configured to transmit the generated data units via the antenna(s) 34. Similarly, the transceiver(s) 30 is/are configured to receive downlink data units via the antenna(s) 34. The PHY processing unit 29 of the client device 25-1 is configured to process received downlink data units having formats described hereinafter, according to various embodiments.

In an embodiment, when operating in single-user mode, the AP 14 transmits a data unit to a single client station 25 (DL SU transmission), or receives a data unit transmitted by a single client station 25 (UL SU transmission), without simultaneous transmission to, or by, any other client station 25. When operating in multi-user mode, the AP 14 transmits a data unit that includes multiple data streams for multiple client stations 25 (DL MU transmission), or receives data units simultaneously transmitted by multiple client stations 25 (UL MU transmission), in an embodiment. For example, in multi-user mode, a data unit transmitted by the AP includes multiple data streams simultaneously transmitted by the AP 14 to respective client stations 25 using respective spatial streams allocated for simultaneous transmission to the respective client stations 25 and/or using respective sets of OFDM tones corresponding to respective frequency sub-channels allocated for simultaneous transmission to the respective client stations.

Figure 2:
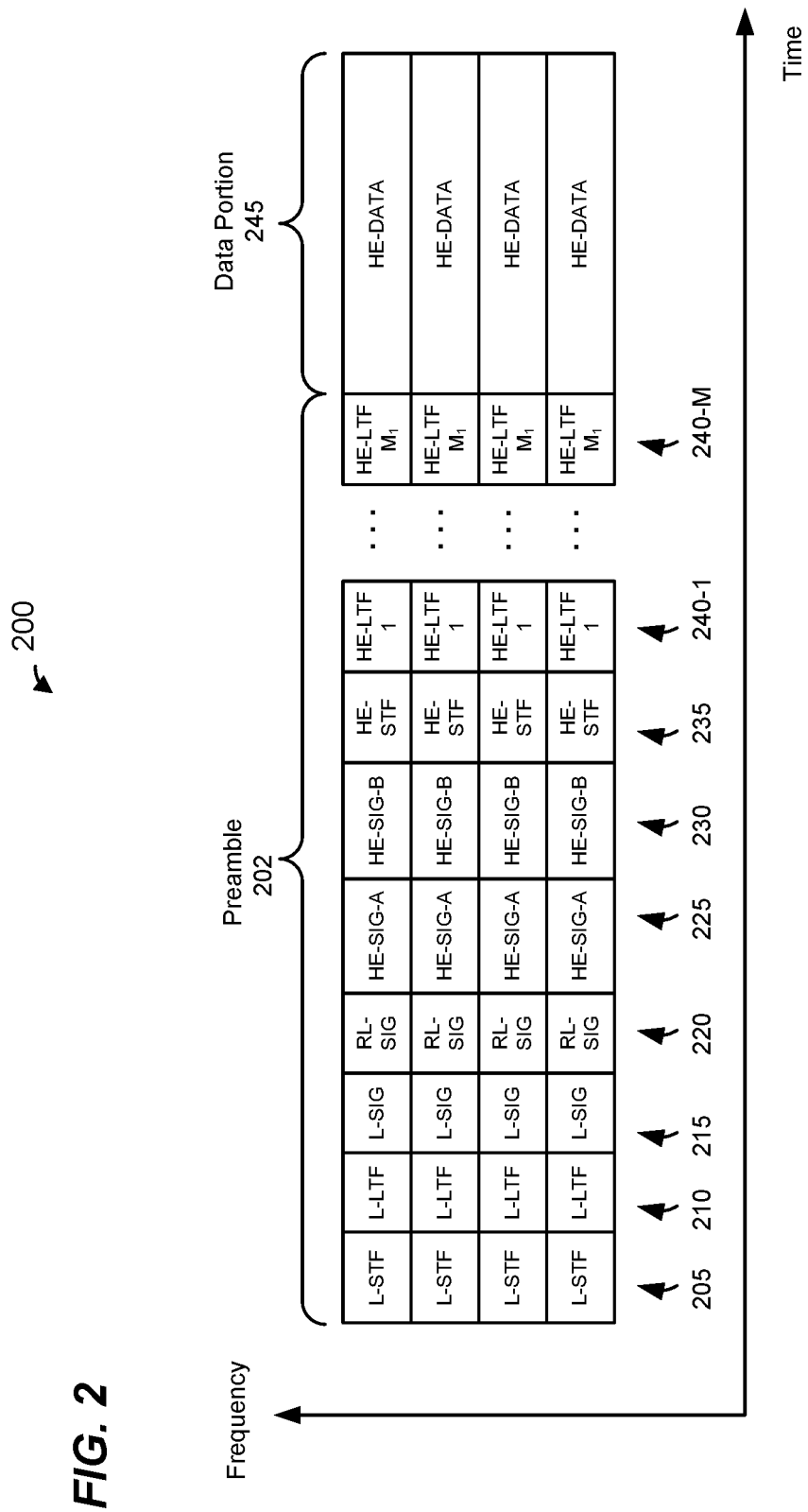
FIG. 2 is a diagram of an orthogonal frequency division multiple access (OFDMA) physical layer (PHY) data unit, according an embodiment.

FIG. 2 is a diagram of a physical layer (PHY) data unit 200 that the AP 14 is configured to transmit to one or more client stations 25 (e.g., the client stations 25-1), according to an embodiment. In an embodiment, one or more client stations 25 (e.g., the client stations 25-1) are also configured to transmit data units the same as or similar to the PHY data unit 200 to the AP 14. The PHY data unit 200 occupies a 20 MHz bandwidth. PHY data units similar to the PHY data unit 200 occupy other suitable bandwidth such as 40 MHz, 80 MHz, 160 MHz, 320 MHz, 640 MHz, for example, or other suitable bandwidths, in other embodiments.

In various embodiments and/or scenarios, the PHY data unit 200 is a downlink (DL) orthogonal frequency division multiple access (OFDMA) unit in which independent data streams are transmitted to multiple client stations 25 using respective sets of OFDM tones and, in some cases respective spatial streams, allocated to the client stations 25. Similarly, in various embodiments and/or scenarios, the PHY data unit 200 is an uplink (UL) OFDMA data unit transmitted by a particular client station 25 as part of an OFDMA uplink transmission by multiple client stations 25, wherein each of the multiple client stations 25 transmits data using a respective set of OFDM tones and, in some cases, respective one or more spatial streams, allocated to the client station 25. For example, in an embodiment, available OFDM tones (e.g., OFDM tones that are not used as DC tones, guard tones, etc.) are allocated among multiple blocks that each correspond to a respective one of the (or more, e.g., if also using MU-MIMO) client stations 25 for transmission of data to, or by, the one or more of the client stations 25. In an embodiment, allocation of OFDM tones is performed using resource units (RUs). In an embodiment, an RU is a unit of frequency resources in an OFDMA data unit that can be allocated. For example, in an embodiment, an RU corresponds to K OFDM tones, wherein K is a suitable integer greater than zero. As just an illustrative example, K=26, according to an illustrated embodiment. Accordingly, a basic resource unit includes 26 OFDM tones, in this embodiment. An RU allocated to a client station 25 (or allocated to a multi-user group of client stations 25, e.g., if MU-MIMO is being utilized) includes an integer number of basic resource units. Therefore, the RU includes a number of OFDM tones that is an integer multiple of 26 OFDM tones, such as 26 OFDM tones, 52 OFDM tones, 78 OFDM tones, etc., in this embodiment. In another embodiment, K is any suitable integer other than 26, and an RU therefore includes a suitable number of OFDM tones other than 26. For example, in various embodiments, K is 52, 78, 104, 130, etc. As another example, in various embodiments, K is 2, 4, 8, 16, etc. In some embodiments, a WLAN may utilize RUs with different sizes K in different situations. For example, in an embodiment, a WLAN may utilize RUs with different sizes K when utilizing communication channels of different bandwidths.

The PHY data unit 200 includes a preamble including a legacy short training field (L-STF) 205, a legacy long training field (L-LTF) 210, a legacy signal field (L-SIG) 215, a repeated legacy signal field (RL-SIG) 220, a first HE signal field (HE-SIG-A) 225, a second HE signal field (HE-SIG-B) 230, an HE short training field (HE-STF) 235, M HE long training fields (HE-LTFs) 240, where M is a suitable positive integer. In some embodiments and/or scenarios, M corresponds to a number of spatial streams utilized in the PHY data unit 200. In some embodiments and/or scenarios, M is greater than the number of spatial streams utilized in the PHY data unit 200. In some embodiments and/or scenarios, the PHY data unit 200 also includes a data portion 245. In some embodiments and/or scenarios, the PHY data unit 200 omits the data portion 245 (e.g., for a null data packet (NDP), etc.).

In some embodiments and/or scenarios, the preamble 202 omits one or more of the fields 205-240. For example, the preamble 202 omits one or more of the HE-SIG-A 225 and the HE-SIG-B 230, in an embodiment. In some embodiments, the preamble 202 includes additional fields not illustrated in FIG. 2.

Each of the L-STF 205, the L-LTF 210, the L-SIG 215, the RL-SIG 220, HE-SIG-A 225, the HE-SIG-B 230, the HE-STF 235, and the M HE-LTFs 240 comprises one or more OFDM symbols. The HE-SIG-A 225 and the HE-SIG-B 230 is each individually encoded to generate the respective number of OFDM symbols, in an embodiment. As merely an example, in an embodiment, the HE-SIG-A 225 comprises two OFDM symbols the HE-SIG-B 230 comprises one OFDM symbol. As merely another example, in another embodiment, the HE-SIG-A 225 comprises one OFDM symbol and the HE-SIG-B 230 comprises two OFDM symbols. As yet another example, in an embodiment, the HE-SIG-A 225 comprises two OFDM symbols and the HE-SIG-B 230 comprises a variable number of OFDM symbols. In an embodiment in which the HE-SIG-B 230 comprises a variable number of OFDM symbols, the particular number of HE-SIG-B 230 OFDM symbols in the PHY data unit 200 is indicated in the HE-SIG-A 225. As yet another example, in an embodiment, the HE-SIG-A 225 comprises two OFDM symbols and the HE-SIG-B 230 is omitted.

In the embodiment of FIG. 2, the PHY data unit 200 includes one of each of the L-STF 205, the L-LTF 210, the L-SIG 215, RL-SIG 220 the HE-SIG-A 225, and HE-SIG-B in each of a plurality of component channels. In an embodiment, each component channel occupies a bandwidth of 20 MHz. In other embodiments, each component channel occupies another suitable bandwidth (e.g., 1 MHz, 2 MHz, 5 MHz, 10 MHz, etc.). In an embodiment, the PHY data unit 200 occupies a cumulative bandwidth of 80 MHz. In other embodiments in which a data unit similar to the PHY data unit 200 occupies a another suitable cumulative bandwidth other than 80 MHz (e.g., 40 MHz, 160 MHz, 320 MHz, etc.), each of the L-STF 205, the L-LTF 210, the L-SIG 215, the RL-SIG 220, HE-SIG-A 225, and HE-SIG-B 230 is repeated over a corresponding number of 20 MHz sub-bands of the whole bandwidth of the data unit, in an embodiment. For example, in an embodiment, the data unit occupies an 160 MHz bandwidth and, accordingly, includes eight of each of the L-STF 205, the L-LTF 210, the L-SIG 215, the RL-SIG 220, the HE-SIG-A 225, and the HE-SIG-B 230.

In an embodiment, each of the HE-SIG-A 225 and the HE-SIG-B 230 generally carries information about the format of the PHY data unit 200, such as information needed to properly decode at least a portion of the PHY data unit 200, in an embodiment. In an embodiment in which the PHY data unit 200 is a multi-user data unit, HE-SIG-A 225 carries information commonly needed by multiple intended receivers of the PHY data unit 200. In some embodiments, HE-SIG-A 225 additionally includes information for client stations 25 that are not intended receivers of the PHY data unit 200, such as information needed for medium protection from the client stations 25 that are not receivers of the PHY data unit 200. On the other hand, HE-SIG-B 230 carries user-specific information individually needed by each client station 25 that is an intended recipient of the PHY data unit 200, in an embodiment. In an embodiment, HE-SIG-A 225 includes information needed to properly decode HE-SIG-B 230, and HE-SIG-B 230 includes information needed to properly decode data streams in the data portion 245 of the PHY data unit 200. In some embodiments and/or scenarios, however, HE-SIG-A 225 includes at least some of the information needed to decode the data portion 245, and HE-SIG-B 230 is omitted from the PHY data unit 200 in at least some such embodiments. In at least some embodiments and scenarios in which the AP 14 is the intended recipient of the PHY data unit 200 (i.e., when the PHY data unit 200 is an uplink data unit), information needed to properly decode the data portion of the PHY data unit 200 is known a priori to the intended recipient of the PHY data unit 200 and need not be included in the preamble of the PHY data unit 200. In some such embodiments, the HE-SIG-B 230 is omitted from the PHY data unit 200.

In some embodiments, specific information included in the HE-SIG-A 225 and/or in the HE-SIG-B 230 depends on the mode of transmission of the PHY data unit 200. For example, information included in the HE-SIG-A 225 and/or information included in the HE-SIG-B 230 depends on mode of transmission of the PHY data unit 200, in an embodiment. In an embodiment, different information is included in the HE-SIG-A 225 when the PHY data unit 200 is a downlink data unit as compared to information included in the HE-SIG-A 225 when the PHY data unit 200 is an uplink data unit. Additionally or alternatively, different information is included in the HE-SIG-A 225 when the PHY data unit 200 is a multi-user data unit as compared to information included in the HE-SIG-A 225 when the PHY data unit 200 is a single-user data unit, in an embodiment. In another embodiment, different information is included in the HE-SIG-B 230 when the PHY data unit 200 is a downlink data unit as compared to the information is included in the HE-SIG-B 230 when the PHY data unit 200 is an uplink data unit.

Figure 3:
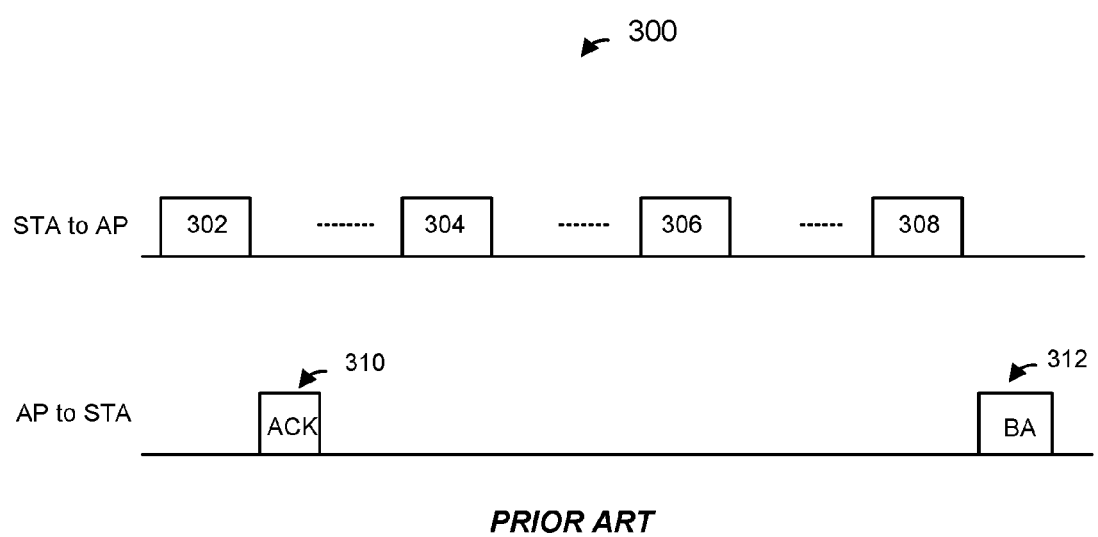
FIG. 3 is a diagram of an example prior art acknowledgement procedure.

FIG. 3 is a diagram of a prior art frame exchange 300 between an AP and one or more client stations. In an embodiment, the frame exchange 300 is according to a legacy communication protocol. A client station transmits PHY data units 302, 304, 306, and 308 to an AP. In an embodiment, PHY data units 302, 304, 306, and 308 correspond to MAC protocol data units (MPDUs) within respective physical layer convergence protocol (PLCP) protocol data units (PPDUs) to the AP 14. In an embodiment, one or more of the PHY data units 302, 304, 306, and 308 correspond to aggregated MPDUs (A-MPDUs) transmitted in a PPDU to the AP 14.

Each of the PHY data units 302, 304, 306, and 308 includes an indication of an acknowledgement policy to be followed by the AP 14 in response to receiving the data units 302, 304, 306, and 308. The acknowledgement policy indication in a PHY data unit specifies when the AP should transmit an acknowledgement in response to receiving the corresponding data unit. In an embodiment, the acknowledgement policy indication is one of an immediate acknowledgement (ACK) request or a non-immediate ACK request. When the PHY data unit specifies an immediate ACK, the AP must immediately acknowledge the reception of the PHY data unit. On the other hand, if the PHY data unit specifies a non-immediate ACK, the AP should acknowledge reception of the PHY data unit later (e.g., after receiving other PHY data units from the client station) in a block acknowledgment (BA) and only after receiving another PHY data unit that specifies an immediate ACK.

In an embodiment, the PHY data unit 302 includes an acknowledgement policy indication that requests an immediate ACK. In response to receiving the PHY data unit 302, the AP 14 transmits an ACK frame 310 after a suitable time period (e.g., a short interframe space (SIFS)). PHY data units 304 and 306 have an acknowledgment policy indication that specifies a non-immediate ACK. Therefore, the AP does not transmit an ACK after either of the PHY data units 304, 306. PHY data unit 308 includes an acknowledgement policy indication that requests an immediate ACK. Therefore, in response to receiving data unit 308, the AP transmits a BA frame 312 indicating the reception of the PHY data units 304, 306, and 308.

In the prior art procedure illustrated in FIG. 3, an AP can only transmit an ACK or a BA in response to receiving a data unit with the acknowledgement policy indication specifying an immediate ACK. If an AP, detects a missing MPDU in a block of MPDUs that specify the non-immediate ACK, the AP cannot immediately inform the client station of the missing MPDU. In addition, the AP is unable to release the received block of MPDUs in its receive buffer because there is a missing MPDU.

Figure 4:
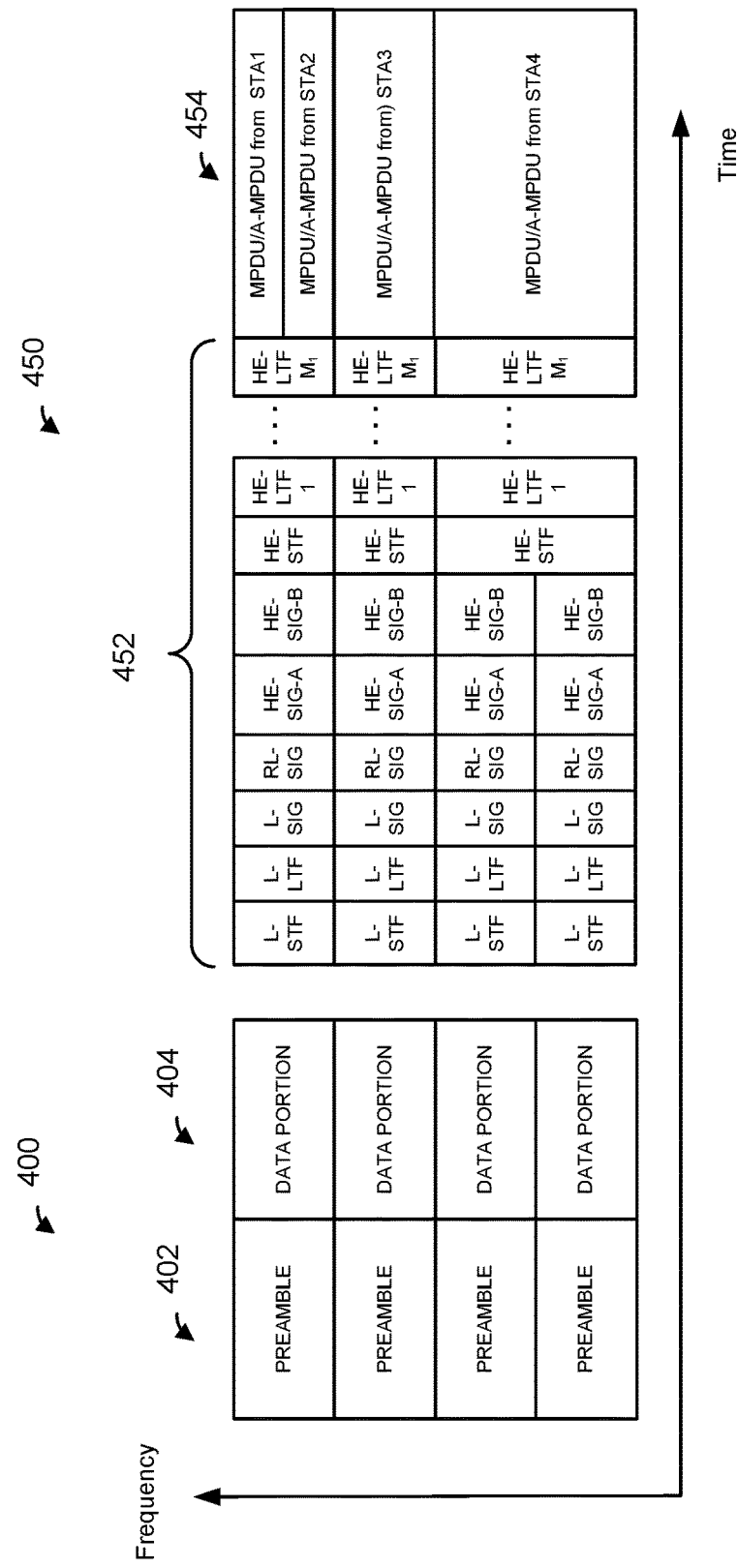
FIG. 4 is a diagram of an example frame exchange corresponding to an uplink OFDMA transmission, according to an embodiment.

FIG. 4 is a diagram of an example multi-user frame exchange, according to an embodiment. A PHY data unit 400 corresponds to a trigger frame that prompts a multi-user uplink transmission, in an embodiment. The PHY data unit 400 includes a preamble portion 402 and a data portion 404. In an embodiment, the preamble portion 402 corresponds to a legacy preamble and conforms to a preamble format according to a legacy communication protocol, such as the IEEE 802.11a Standard, the IEEE 802.11n Standard, or the IEEE 802.11ac Standard, for example, in an embodiment. In another embodiment, the preamble 402 corresponds to a non-legacy preamble that conforms to the IEEE 802.11ax Standard (now being developed), for example, or conforming to another suitable communication protocol. For example, in an embodiment, the preamble portion 402 includes a preamble having a structure such as (e.g., the same as or similar to) the preamble 204 of FIG. 2. At least some fields in the preamble portion 402 are duplicated in each 20 MHz bandwidth portion of the data unit 400, according to some embodiments.

In an embodiment, the data portion 404 includes independent data for multiple client stations, in an embodiment. In an embodiment, the data portion 404 includes data that is duplicated in multiple component channels (e.g., in multiple 20 MHz bandwidth portions), in an embodiment. In an embodiment, the data portion 404 includes a trigger frame that triggers an uplink OFDMA transmission 450 by a plurality of client stations 25. In an embodiment, the trigger frame includes information that indicates an allocation of sub-channels to be used for the uplink OFDMA transmission 450, in an embodiment. The trigger frame further indicates other transmission parameters to the multiple client stations 25, such as which modulation and coding scheme (MCS) each of the client stations should use, an OFDM numerology (e.g., guard interval, tone spacing, etc.) that each of the multiple client stations should use, transmit power that each of the multiple client stations 25 should use, etc. In an embodiment, the trigger frame is a duplicate broadcast frame transmitted to the multiple client stations 25 in each 20 MHz component channel of the data unit 400. In another embodiment, the trigger frame is a broadcast frame that occupies the entire bandwidth of the data unit 400.

The data unit 450 includes a preamble portion 452 and a data portion 454. In an embodiment, the preamble portion 452 includes a preamble such as the preamble 204 of FIG. 2.

In an embodiment, the data portion 454 of the data unit 450 includes a plurality of MAC protocol data units (MPDUs) and/or aggregated MAC protocol data units (A-MPDUs) respectively directed to ones of multiple client stations 25. In an embodiment, at least some of the MPDUs and/or A-MPDUs in the data portion 454 occupy sub-channels that span a bandwidth smaller than a component channel bandwidth.

Figure 5:
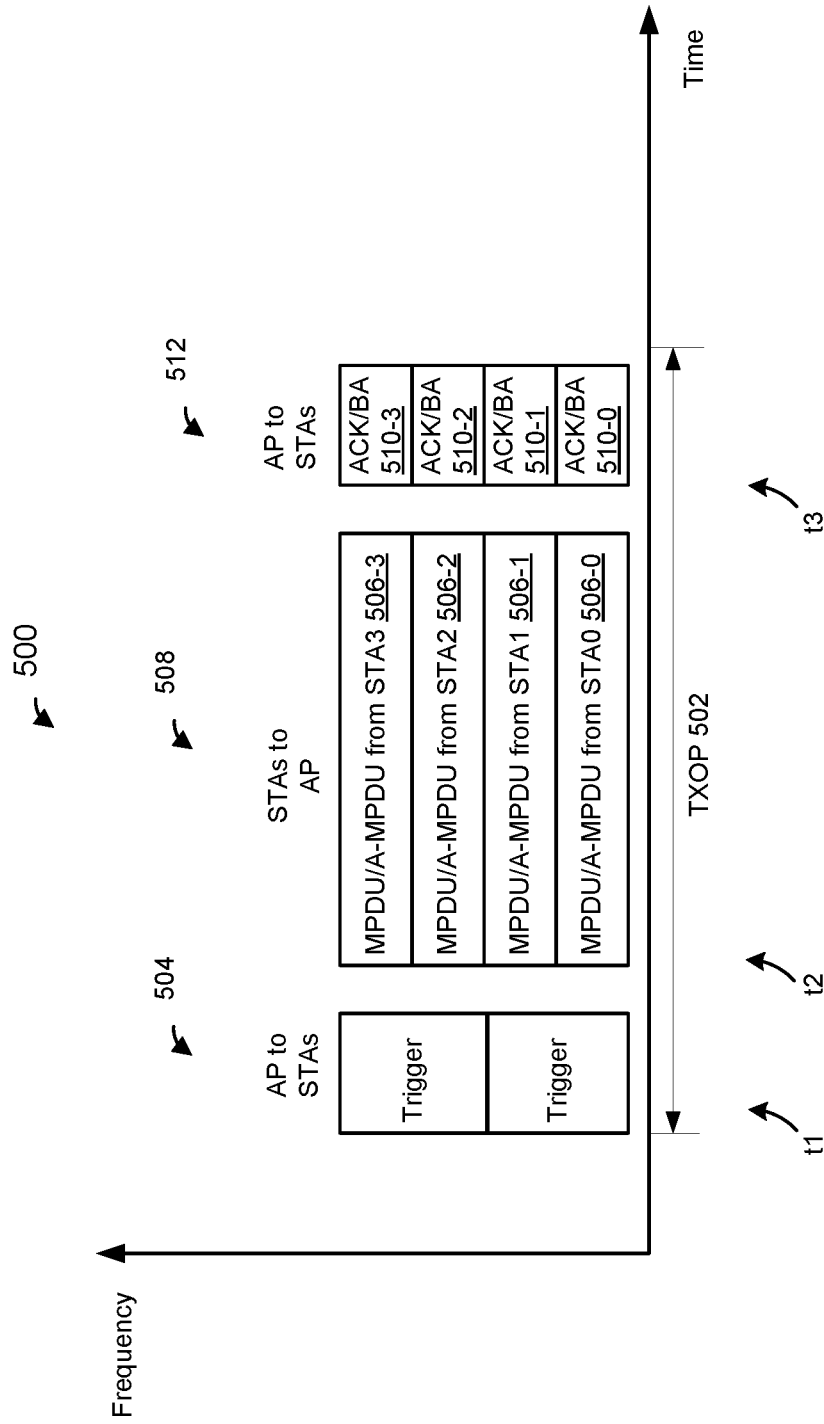
FIG. 5 is a diagram of an example frame exchange corresponding to an acknowledgment of an uplink OFDMA transmission, according to an embodiment.

FIG. 5 is a diagram of an example transmission sequence 500 in a WLAN, such as the WLAN 10 of FIG. 1, according to an embodiment. In the example illustrated in FIG. 5, an AP, such as the AP 14, triggers an UL OFDMA transmission by multiple client stations, such as multiple ones of the client stations 25, during a transmission opportunity period (TXOP) 502. In an embodiment, the TXOP 502 is obtained by (e.g., based on a suitable channel assessment procedure, such as CSMA/CA), or scheduled by, the AP 14. At a time t1, the AP 14 transmits a trigger frame 504 to a plurality of client stations 25. In an embodiment, the trigger frame 504 provides, to the plurality of client stations 25, resource unit allocation information and/or other transmission parameters corresponding to a subsequent uplink OFDMA transmission during the TXOP 502.

At time t2 each client station 25 participating in the UL OFDMA transmission begins transmitting as part of the UL OFDMA transmission. In an embodiment, t2 begins upon expiration of a suitable predetermined time interval (e.g., a short inter-frame space (SIFS)) after completion of reception of the trigger frame 504 at the client stations 25. In another embodiment, a suitable predetermined time period other than SIFS is utilized.

The client stations 25 (STA0-STA3) transmit an uplink OFDMA transmission 508, wherein the UL OFDMA transmission 508 includes PHY data units 506 from respective stations 25. In an embodiment, each client station transmits a corresponding PHY data unit 506 starting at the time t2 in a respective sub-channel (e.g., comprising one or more RUs), allocated to the client station 25, as indicated in the trigger frame 504, for example. In an embodiment, each client station transmits a respective PHY data unit 506 using transmission parameters, such as a modulation and coding scheme, a coding type, transmission power, length or duration of the data unit, etc. indicated in the trigger frame 504 In another embodiment, at least some of the client stations transmit PHY data units 506 using at least some transmission parameters, such as a modulation and coding scheme, a coding type, transmission power, length or duration of the data unit, etc. determined by the client stations and not indicated in the trigger frame 504. In an embodiment, PHY data units 506 include MPDUs and/or A-MPDUs transmitted from respective client stations. In some embodiments and/or scenarios, a transmission in a sub-channel in the UL OFDMA transmission 508 may be an MU-MIMO transmission from multiple client stations 25, e.g., via multiple spatial streams.

In an embodiment, one or more MPDUs/A-MPDUs within the OFDMA transmission 508 include an indication of acknowledgement policy to be followed by the AP 14 in response to receiving the MPDUs/A-MPDUs. In an embodiment, one or more MPDUs/A-MPDUs within the OFDMA transmission 508 include respective acknowledgement policy indications that requests an immediate ACK. In an embodiment, one or more MPDUs/A-MPDUs within the OFDMA transmission 508 include respective acknowledgement policy indications that request a non-immediate ACK.

At time t3, the AP transmits a DL OFDMA transmission 512, according to an embodiment. In another embodiment, the transmission 512 is a single user (SU) or broadcast transmission duplicated in multiple subchannels (e.g., component channels). In an embodiment, the SU or broadcast transmission in each subchannel conforms to a legacy protocol. In an embodiment, time t3 begins upon expiration of a suitable predetermined time interval (such as a SIFS or some other suitable time period), after completion of reception of the OFDMA transmission 508 at the AP 14, in an embodiment. In an embodiment, the DL OFDMA transmission 512 includes respective ACK frames and/or BA frames 510 to the client stations 25 (STA0 through STA3), acknowledging receipt of the PHY data units 506 from the client stations 25. In an embodiment in which the transmission 512 includes a SU or broadcast transmission duplicated in multiple subchannels (e.g., component channels), the SU or broadcast transmission 510 in each subchannel includes respective ACK frames and/or BA frames to the client stations 25 (STA0 through STA3), acknowledging receipt of the PHY data units 506 from the client stations 25. In an embodiment, each ACK/BA frame 510 is a broadcast acknowledgement frame that includes respective acknowledgements for the client stations 25 (STA0 through STA3). In an embodiment, the broadcast acknowledgement frame is a multi-user block acknowledgement (M-BA) frame that includes respective block acknowledgements for the respective client stations 25 (STA0 through STA3).

In an embodiment, the AP is permitted to ignore the indication of acknowledgement policy in an UL OFDMA transmission from a client station 25, and thus the AP can act contrary to the indication of acknowledgement policy in an UL OFDMA transmission. For example, according to an embodiment and in an illustrative scenario, when the indication of acknowledgement policy in the UL OFDMA transmission from the client station 25 specifies an immediate ACK, the AP instead does not immediately transmit an ACK to the client station 25, but rather the AP waits until one or more other UL OFDMA transmissions are received. This may be useful, for example, when only a minority of client stations 25 (or even merely less than all client stations 25) participating in an UL OFDMA transmission requested immediate ACKs to the OFDMA transmission, according to an embodiment. As another example, according to an embodiment and in another illustrative scenario, when the indication of acknowledgement policy in the UL OFDMA transmission from the client station 25 specifies a non-immediate ACK, the AP instead immediately transmits an ACK to the client station 25, rather than waiting until one or more other UL OFDMA transmissions are received. This may be useful, for example, when only a minority of client stations 25 (or even merely less than all client stations 25) participating in an UL OFDMA transmission requested non-immediate ACKs to the OFDMA transmission, according to an embodiment.

In another embodiment, the AP is not permitted to ignore the indication of acknowledgement policy in an UL OFDMA transmission from a client station 25 when the client station 25 requests an immediate ACK; on the other hand, if the indication of acknowledgement policy specifies a non-immediate ACK, the AP can ignore the request and instead send an immediate ACK. For example, according to an embodiment and in an illustrative scenario, when the indication of acknowledgement policy in the UL OFDMA transmission from the client station 25 specifies an immediate ACK, the AP must immediately transmit an ACK to the client station 25. As another example, according to an embodiment and in another illustrative scenario, when the indication of acknowledgement policy in the UL OFDMA transmission from the client station 25 specifies a non-immediate ACK, the AP instead immediately transmits an ACK to the client station 25, rather than waiting until one or more other UL OFDMA transmissions are received.

In some embodiments and/or scenarios, transmitting an immediate acknowledgement, even when a client station did not request an immediate acknowledgement, is advantageous by allowing an AP, such as the AP 14, to release MPDUs in a receive buffer, thereby reducing a buffer size requirement.

Figure 6:
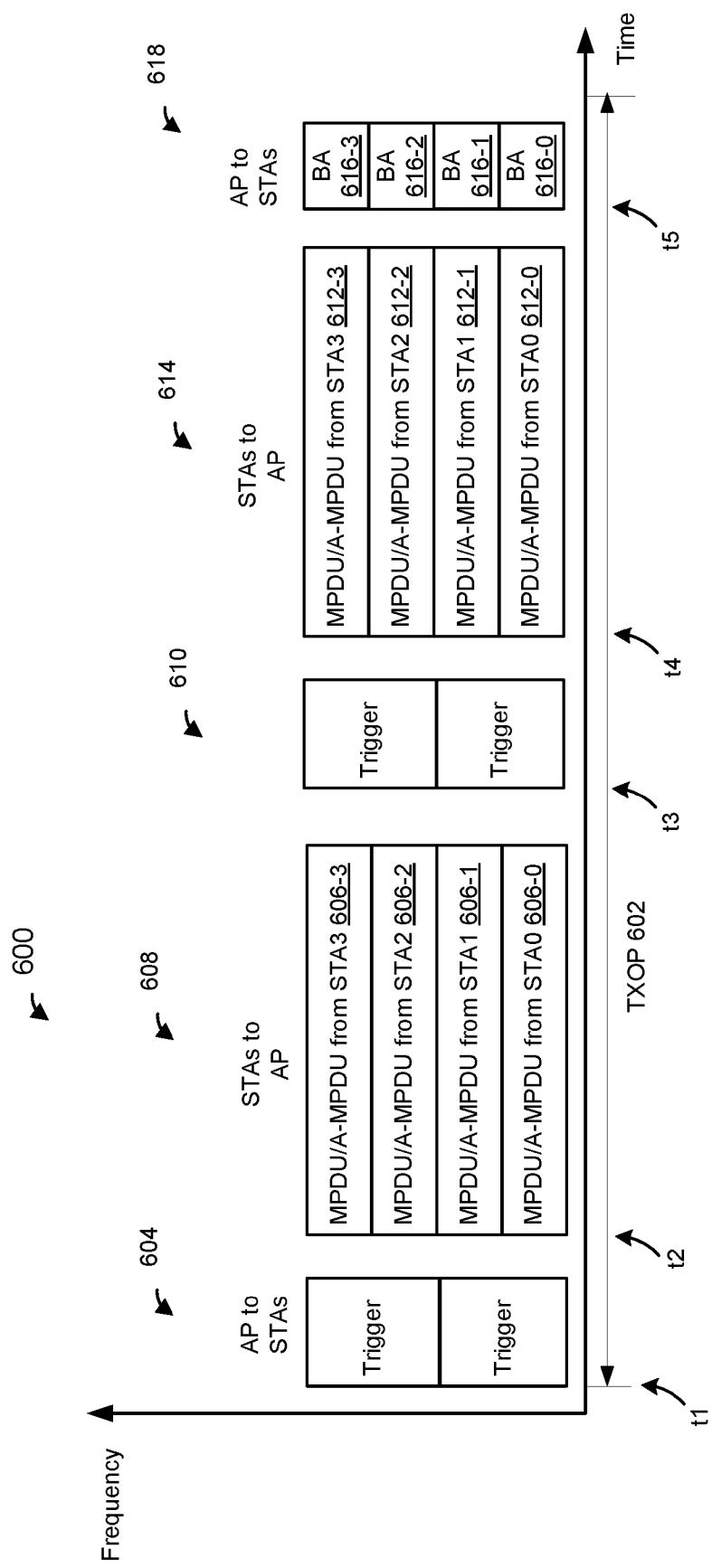
FIG. 6 is a diagram of an example frame exchange corresponding to a block acknowledgment of multiple uplink OFDMA transmissions, according to an embodiment.

FIG. 6 is a diagram of an example transmission sequence 600 in a WLAN, such as the WLAN 10 of FIG. 1, according to an embodiment. In the example transmission sequence 600, an AP, such as the AP 14, triggers an uplink OFDMA transmission by multiple client stations, such as multiple ones of the client stations 25, during a TXOP 602.

At a time t1, the AP 14 transmits a trigger frame 604 to a plurality of client stations 25. In an embodiment, the trigger frame 604 provides, to the plurality of client stations 25, resource unit allocation information and/or other transmission parameters corresponding to a subsequent uplink OFDMA transmission during the TXOP 602.

At time t2 each client station 25 participating in the UL OFDMA transmission begins transmitting as part of the UL OFDMA transmission. In an embodiment, t2 begins upon expiration of a suitable predetermined time interval (e.g., SIFS) after completion of reception of the trigger frame 604 at the client stations 25. In another embodiment, a suitable predetermined time period other than SIFS is utilized.

The client stations 25 (STA0-STA3) transmit an uplink OFDMA transmission 608, wherein the UL OFDMA transmission 608 includes PHY data units 606 from respective stations 25. The UL OFDMA transmission 608 is similar to the UL OFDMA transmission 508 of FIG. 5 and will not be described in detail merely for purposes of brevity.

In an embodiment, one or more MPDUs/A-MPDUs 606 within the OFDMA transmission 608 include an indication of acknowledgement policy regarding the AP 14 acknowledging receives of the MPDUs/A-MPDUs 606. In an embodiment, one or more MPDUs/A-MPDUs 606 within the OFDMA transmission 608 include respective acknowledgement policy indications that requests an immediate ACK. In an embodiment, one or more MPDUs/A-MPDUs 606 within the OFDMA transmission 608 include respective acknowledgement policy indications that request a non-immediate ACK.

In an embodiment, the AP does not transmit an immediate ACK responsive the UL OFDMA transmission even though one or more MPDUs/A-MPDUs 606 within the OFDMA transmission 608 include respective acknowledgement policy indications that requests an immediate ACK. Rather, at a time t3, the AP 14 transmits another trigger frame 610 to the plurality of client stations 25. In an embodiment, the trigger frame 610 provides, to the plurality of client stations 25, resource unit allocation information and/or other transmission parameters corresponding to a subsequent uplink OFDMA transmission during the TXOP 602.

At time t4 each client station 25 participating in the UL OFDMA transmission begins transmitting as part of the UL OFDMA transmission. In an embodiment, t4 begins upon expiration of a suitable predetermined time interval (e.g., SIFS) after completion of reception of the trigger frame 610 at the client stations 25. In another embodiment, a suitable predetermined time period other than SIFS is utilized.

In an embodiment, one or more MPDUs/A-MPDUs 612 within the OFDMA transmission 614 include an indication of acknowledgement policy regarding the AP 14 acknowledging receives of the MPDUs/A-MPDUs 612. In an embodiment, all MPDUs/A-MPDUs 612 within the OFDMA transmission 614 include respective acknowledgement policy indications that requests an immediate ACK. In another embodiment, however, one or more MPDUs/A-MPDUs 612 within the OFDMA transmission 614 include respective acknowledgement policy indications that request a non-immediate ACK.

At time t5, the AP transmits a DL OFDMA transmission 618, according to an embodiment. In another embodiment, the transmission 618 is a single user (SU) or broadcast transmission duplicated in multiple subchannels (e.g., component channels). In an embodiment, the SU or broadcast transmission in each subchannel conforms to a legacy protocol. In an embodiment, time t5 begins upon expiration of a suitable predetermined time interval (such as a SIFS or some other suitable time period), after completion of reception of the OFDMA transmission 614 at the AP 14, in an embodiment. In an embodiment, the DL OFDMA transmission 618 includes respective ACK frames and/or BA frames 616 to the client stations 25 (STA0 through STA3), acknowledging receipt of the PHY data units 606 and 612 from the client stations 25. In an embodiment in which the transmission 618 includes a SU or broadcast transmission duplicated in multiple subchannels (e.g., component channels), the SU or broadcast transmission 616 in each subchannel includes respective ACK frames and/or BA frames to the client stations 25 (STA0 through STA3), acknowledging receipt of the PHY data units 606 and 612 from the client stations 25. In an embodiment, each ACK/BA frame 616 is a broadcast acknowledgement frame that includes respective acknowledgements for the client stations 25 (STA0 through STA3). In an embodiment, the broadcast acknowledgement frame is a multi-user block acknowledgement (M-BA) frame that includes respective block acknowledgements for the respective client stations 25 (STA0 through STA3).

In an embodiment, and in a scenario in which one or more MPDUs/A-MPDUs 612 within the OFDMA transmission 614 include respective acknowledgement policy indications that request a non-immediate ACK, the AP transmits an immediate ACK responsive the UL OFDMA transmission 614 even though one or more MPDUs/A-MPDUs 612 within the OFDMA transmission 614 include respective acknowledgement policy indications that requests a non-immediate ACK.

Figure 7:
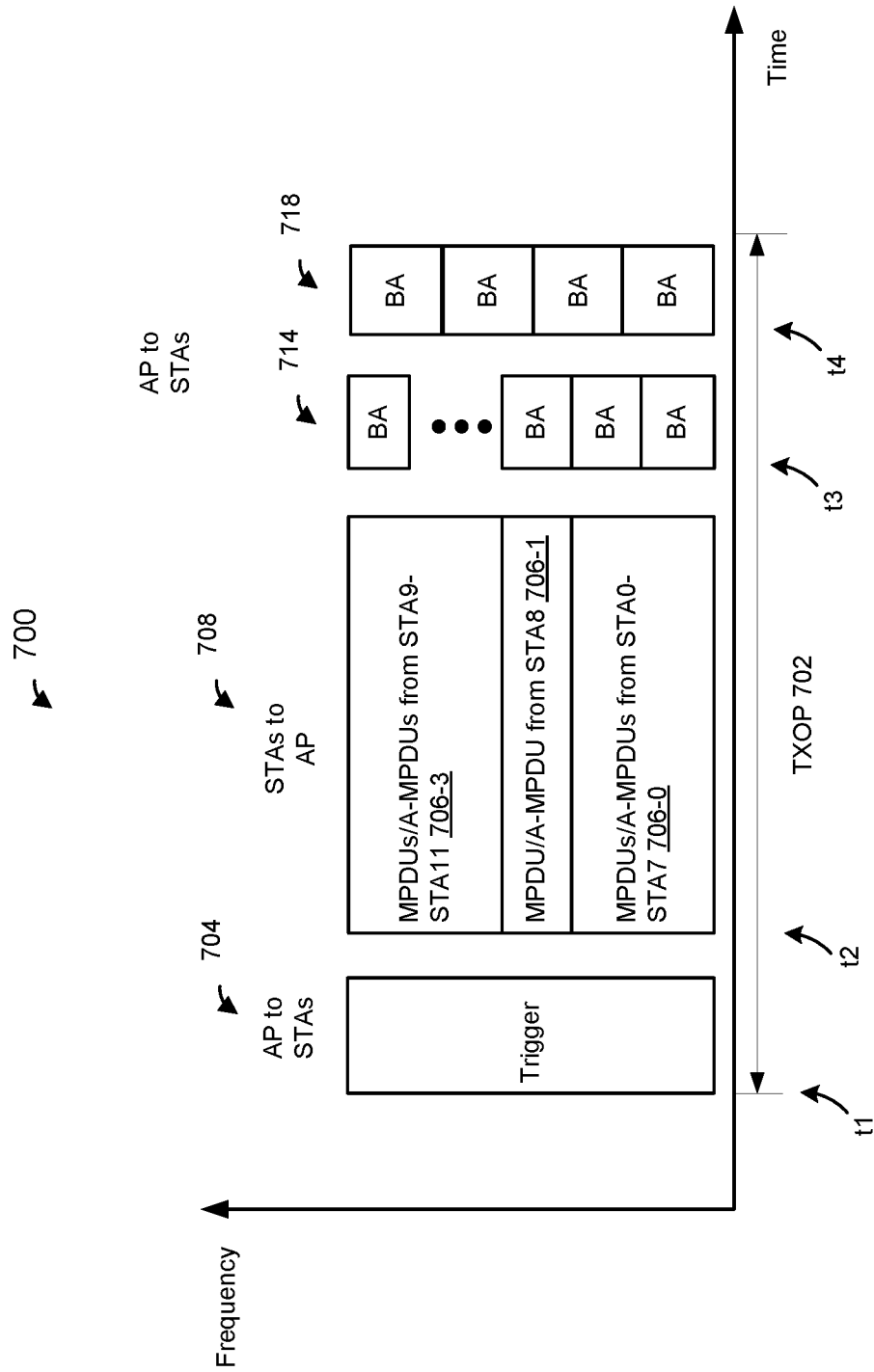
FIG. 7 is a diagram of an example frame exchange corresponding to an acknowledgment of an uplink OFDMA transmission, according to an embodiment.

In an embodiment, more than one downlink OFDMA transmission can be used for acknowledgement of a single UL OFDMA transmission. FIG. 7 is a diagram of an example transmission sequence 700 in a WLAN, such as the WLAN 10 of FIG. 1, according to an embodiment, in which an AP, such as the AP 14, triggers an uplink OFDMA transmission by multiple client stations, such as multiple ones of the client stations 25, during TXOP 702. At a time t1, the AP 14 transmits a trigger frame 704 to a plurality of client stations 25. In an embodiment, the trigger frame 704 is similar to trigger frame 504 and/or the trigger frame 604, and is not discussed in detail for purposes of brevity.

At a time t2, client stations 25 (e.g., STA0 to STA11) transmit an UL OFDMA transmission 708, wherein the UL OFDMA transmission 708 includes PHY data units 706. In an embodiment, the UL OFDMA transmission 708 is similar to the UL OFDMA transmission 508 and/or the UL OFDMA transmission 708, and is not discussed in detail for purposes of brevity. In an embodiment, the UL OFDMA transmission 708 includes transmissions from a number of client stations 25 that is greater than a maximum number of client stations than can be acknowledged in a single DL OFDMA acknowledgment frame. As an illustrative example, according to an illustrative embodiment, a communication protocol defines a DL OFDMA ACK frame that can be used to acknowledge transmissions from at most nine client stations, whereas the UL OFDMA transmission 708 includes transmissions from more than nine client stations.

Therefore, in an embodiment, the AP 14 acknowledges the UL OFDMA transmission 708 with multiple DL OFDMA ACK frames. For example, at a time t3, the AP 14 transmits respective BA frames in a first downlink OFDMA ACK frame 714 to respective client stations 25, in response to receiving the uplink OFDMA transmission 708, but only a subset of client stations (e.g., STA0 through STA8) that participated in the uplink OFDMA transmission 708 are acknowledged in the downlink OFDMA ACK frame 714. For instance, in an embodiment, whereas the UL OFDMA data transmission 708 included transmissions from twelve client stations (STA0-STA11), the downlink OFDMA ACK frame 714 acknowledges transmissions of only nine client stations (e.g., STA0 to STA8).

At a time t4, the AP 14 transmits respective BA frames in a second downlink OFDMA ACK frame 718 to respective client stations 25, also in response to receiving the uplink OFDMA transmission 708, but another subset of client stations (e.g., STA9 through STA11) that participated in the uplink OFDMA transmission 708 are acknowledged in the downlink OFDMA ACK frame 718. In an embodiment, t4 begins upon expiration of a suitable predetermined time interval (e.g., SIFS) after completion of transmission of the downlink OFDMA ACK frame 714. In another embodiment, a suitable predetermined time period other than SIFS is utilized.

In an embodiment, whereas the UL OFDMA data transmission 708 included transmissions from twelve client stations (STA0-STA11), and whereas the downlink OFDMA ACK frame 714 acknowledged transmissions of nine client stations (e.g., STA0 to STAB), the downlink OFDMA ACK frame 718 acknowledges transmissions of three client stations (e.g., STA9 to STA11).

In another embodiment, when a UL OFDMA transmission includes transmissions from a number of client stations 25 that is greater than a maximum number of client stations than can be acknowledged in a single DL OFDMA acknowledgment frame, the AP 14 is configured to transmit a broadcast acknowledgement frame that includes respective acknowledgements for the client stations 25 (e.g., STA0 through STA11). In an embodiment, the broadcast acknowledgement frame is an M-BA frame that includes respective block acknowledgements for the respective client stations 25 (e.g., STA0 through STA11).

Figure 8:
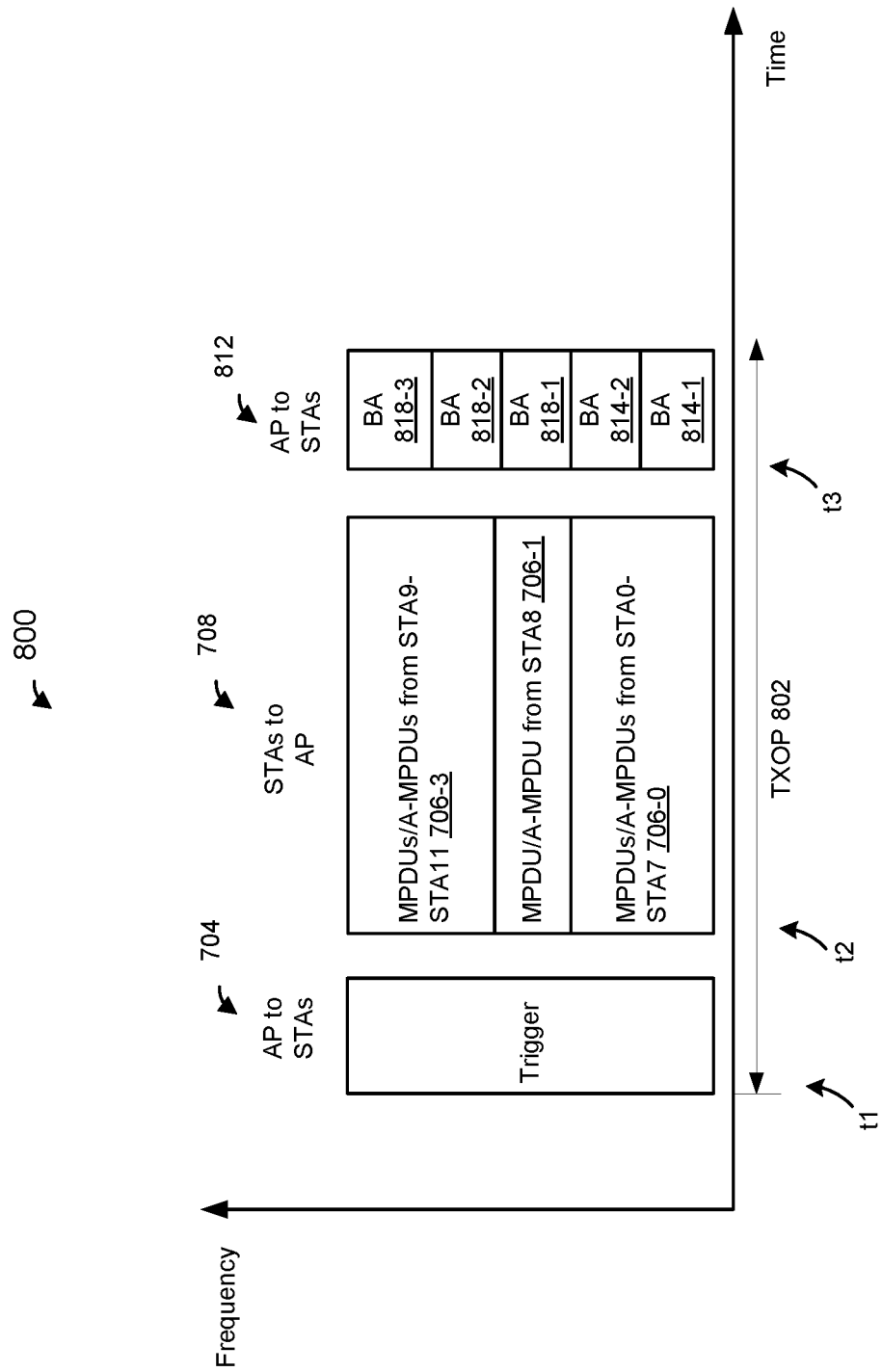
FIG. 8 is a diagram of another example frame exchange corresponding to an acknowledgment of an uplink OFDMA transmission, according to another embodiment.

In another embodiment, when a UL OFDMA transmission includes transmissions from a number of client stations 25 that is greater than a maximum number of client stations than can be acknowledged in a DL OFDMA acknowledgment frame, the AP utilizes MU-MIMO to acknowledge the UL OFDMA transmissions. FIG. 8 is a diagram of an example transmission sequence 800 in a WLAN, such as the WLAN 10 of FIG. 1, according to an embodiment, in which an AP, such as the AP 14, triggers an uplink OFDMA transmission by multiple client stations, such as multiple ones of the client stations 25, during a TXOP 802. The example transmission sequence 800 is similar to the example transmission sequence 700 of FIG. 7, and like-numbered elements are not described in detail for purposes of brevity.

At a time t1, the AP 14 transmits a trigger frame 704 to a plurality of client stations 25. At time t2, the client stations 25 transmit an uplink OFDMA transmission 708, wherein the uplink OFDMA transmission 708 includes PHY data units 706.

At a time t3, the AP 14 transmits a BA transmission 810 in a downlink OFDMA transmission 812 to client stations 25, in response to receiving the uplink OFDMA transmission 708. In an embodiment, the AP transmits each of BA frames 814 using MU MIMO (e.g., using spatial division multiple access (SDMA)) to transmit different BA frames to multiple client stations over a single sub-channel. For instance, in an embodiment, BA 814-1 is comprised of multiple transmissions to multiple client stations, each transmission over a different spatial stream to acknowledge uplink OFDMA transmission 706-0 from multiple client stations 25 (e.g., STA0 to STA3). In an embodiment, use of SDMA techniques requires downlink MU MIMO beamforming training between the AP 14 and the stations to receive the SDMA transmissions.

In an embodiment, BA transmissions 818 do not utilize MU-MIMO.

Figure 9:
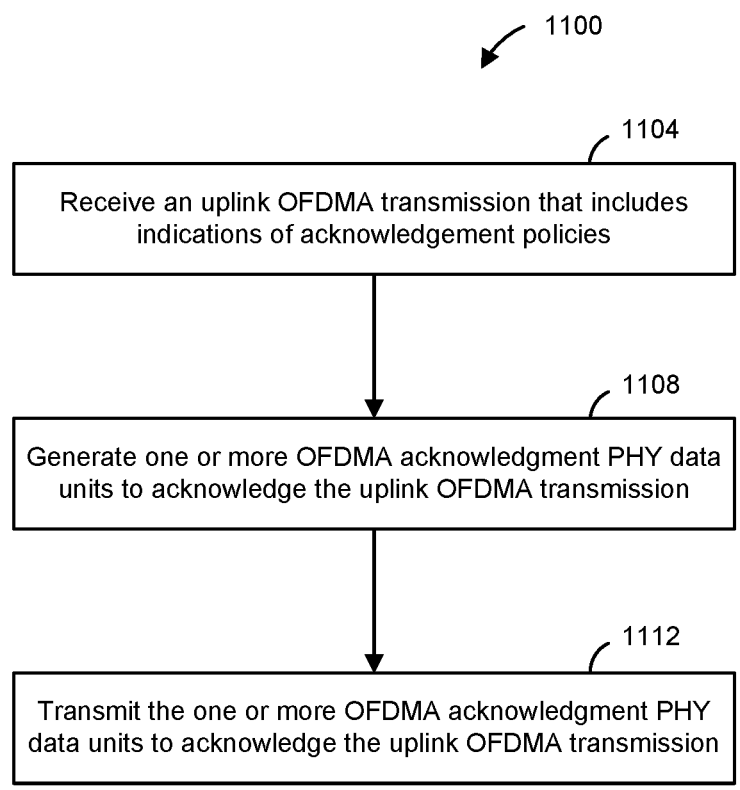
FIG. 9 is flow diagram of an example method for acknowledging an uplink OFDMA transmission, according to an embodiment.

FIG. 9 is a flow diagram of an example method 1100 for acknowledging an uplink OFDMA transmission, according to an embodiment. In some embodiments, the method 1100 is implemented by the AP 14 (FIG. 1). For example, in some embodiments, the network interface device 16 is configured to implement the method 1100. In other embodiments, another suitable network interface device is configured to implement the method 1100.

At block 1104, an uplink OFDMA transmission is received. In an embodiment, the uplink OFDMA transmission includes respective transmissions from multiple communication devices. In an embodiment, the respective transmissions from the multiple communication devices are transmitted in respective frequency portions (e.g., in respective component channels). In an embodiment, the respective transmissions from the multiple communication devices include indications of respective acknowledgement policies corresponding to the respective transmissions.

At block 1108, one or more OFDMA acknowledgment PHY data units to acknowledge the uplink OFDMA transmission are generated. In an embodiment, the one or more OFDMA acknowledgment PHY data units do not comply with at least one of the acknowledgment policies corresponding to the uplink OFDMA transmission.

At block 1112, the one or more OFDMA acknowledgment PHY data units are transmitted to acknowledge the uplink OFDMA transmission, or the one or more OFDMA acknowledgment PHY data units are caused to be transmitted. For example, logic circuitry and/or a processor executing machine readable instructions causes one or more transceivers to transmit the one or more OFDMA acknowledgment PHY data units generated at block 1108.

In an embodiment, one of the acknowledgment policies specifies that a transmission from one of the second communication devices, is to be immediately acknowledged, and the one or more OFDMA acknowledgment PHY data units are generated and/or transmitted such that the uplink OFDMA transmission is not immediately acknowledged. For example, in an embodiment, the AP transmits another PHY data unit that does not acknowledge the uplink OFDMA transmission, prior to transmitting the one or more OFDMA acknowledgment PHY data units that acknowledge the uplink OFDMA transmission.

In an embodiment, one of the acknowledgment policies specifies that a transmission from one of the second communication devices, is not to be immediately acknowledged, but the one or more OFDMA acknowledgment PHY data units are generated and/or transmitted such that the uplink OFDMA transmission is immediately acknowledged. For example, in an embodiment, the AP transmits the one or more OFDMA acknowledgment PHY data units prior to the AP transmitting any other PHY data unit that does not acknowledge the uplink OFDMA transmission.

In an embodiment, the one or more OFDMA acknowledgment PHY data units are generated to include a PHY data unit that includes multiple acknowledgment frames in respective component channels.

In an embodiment, the one or more OFDMA acknowledgment PHY data units are generated to include multiple acknowledgment frames in a single component channel using spatial division multiple access (SDMA).

In an embodiment, the one or more OFDMA acknowledgment PHY data units are generated to include a broadcast acknowledgement frame, the broadcast acknowledgment frame indicating respective block acknowledgements for multiple second communication devices.

In an embodiment, the broadcast acknowledgement frame is an M-BA frame.

In an embodiment, the one or more OFDMA acknowledgment PHY data units are generated to include at least: a first OFDMA acknowledgment PHY data unit to acknowledge one or more respective transmissions in the uplink OFDMA transmission from a first set of one or more second communication devices; and a second OFDMA acknowledgment PHY data unit to acknowledge one or more respective transmissions in the uplink OFDMA transmission from a second set of one or more second communication devices.

In an embodiment, transmitting the one or more OFDMA acknowledgment PHY data units comprises: transmitting the first OFDMA acknowledgment PHY data unit; and after completion of transmitting first OFDMA acknowledgment PHY data unit, transmitting the second OFDMA acknowledgment PHY data unit.

In various embodiments, the method 900 is performed in a manner similar to those described in connection with FIGS. 5-8, or in another suitable manner.

In an embodiment, a method for communicating in a wireless communication network includes: receiving, at the first communication device, an uplink orthogonal frequency multiple access (OFDMA) transmission, wherein the uplink OFDMA transmission includes respective transmissions from the multiple second communication devices, wherein the respective transmissions from the multiple second communication devices include indications of respective acknowledgment policies corresponding to the respective transmissions from the multiple second communication devices; generating, at the first communication device, one or more acknowledgment physical layer (PHY) data units to acknowledge at least a portion of the uplink OFDMA transmission, wherein the one or more acknowledgment PHY data units do not comply with at least one of the acknowledgment policies corresponding to the uplink OFDMA transmission; and transmitting, with the first communication device, the one or more acknowledgment PHY data units to acknowledge the at least the portion of the uplink OFDMA transmission.

In other embodiments, the method includes one of, or any suitable combination of two or more of the following features.

One of the acknowledgment policies specifies that a transmission, included in the OFDMA transmission, from one of the second communication devices, is to be immediately acknowledged; and the method further comprises: transmitting, with the first communication device, another PHY data unit that does not acknowledge the uplink OFDMA transmission, prior to transmitting, with the first communication device, the one or more acknowledgment PHY data units that acknowledge the at least the portion of the uplink OFDMA transmission.

One of the acknowledgment policies specifies that a transmission, included in the OFDMA transmission, from one of the second communication devices, is not to be immediately acknowledged; and the one or more acknowledgment PHY data units are transmitted to immediately acknowledge at least the portion of the uplink OFDMA transmission.

The first communication device transmits the one or more acknowledgment PHY data units prior to the first communication device transmitting any other PHY data unit that does not acknowledge any portion of the uplink OFDMA transmission.

Generating the one or more acknowledgment PHY data units comprises: generating a PHY data unit that includes multiple acknowledgment frames in respective component channels.

Generating the one or more acknowledgment PHY data units further comprises: generating the PHY data unit to include multiple acknowledgment frames in a single component channel using spatial division multiple access (SDMA).

Generating the one or more acknowledgment PHY data units comprises: generating a PHY data unit that includes a broadcast acknowledgement frame, the broadcast acknowledgment frame indicating respective block acknowledgements for multiple second communication devices.

The broadcast acknowledgement frame is a multi-user block acknowledgement (M-BA) frame.

Generating the one or more acknowledgment PHY data units comprises generating at least: a first acknowledgment PHY data unit to acknowledge one or more respective transmissions in the uplink OFDMA transmission from a first set of one or more second communication devices; and a second acknowledgment PHY data unit to acknowledge one or more respective transmissions in the uplink OFDMA transmission from a second set of one or more second communication devices.

Transmitting the one or more acknowledgment PHY data units comprises: transmitting the first acknowledgment PHY data unit; and after completion of transmitting first acknowledgment PHY data unit, transmitting the second acknowledgment PHY data unit.

Generating the one or more acknowledgment PHY data units comprises one of: generating an OFDMA PHY data unit; generating a single user PHY data unit duplicated in a plurality of component channels; and generating a broadcast PHY data unit duplicated in the plurality of component channels.

In another embodiment, an apparatus comprises a network interface device associated with a first communication device. The network interface device includes one or more integrated circuits configured to: receive an uplink orthogonal frequency multiple access (OFDMA) transmission, wherein the uplink OFDMA transmission includes respective transmissions from multiple second communication devices, wherein the respective transmissions from the multiple second communication devices include indications of respective acknowledgment policies corresponding to the respective transmissions from the multiple second communication devices; generate one or more OFDMA acknowledgment physical layer (PHY) data units to acknowledge at least a portion of the uplink OFDMA transmission, wherein the one or more OFDMA acknowledgment PHY data units do not comply with at least one of the acknowledgment policies corresponding to the uplink OFDMA transmission; and cause the first communication device to transmit the one or more OFDMA acknowledgment PHY data units to acknowledge the at least the portion of the uplink OFDMA transmission.

In other embodiments, the apparatus includes one of, or any suitable combination of two or more of the following features.

One of the acknowledgment policies specifies that a transmission, included in the OFDMA transmission, from one of the second communication devices, is to be immediately acknowledged; and the one or more integrated circuits are configured to: cause the first communication device to transmit another PHY data unit that does not acknowledge the uplink OFDMA transmission, prior to transmitting, with the first communication device, the one or more acknowledgment PHY data units that acknowledge the at least the portion of the uplink OFDMA transmission.

One of the acknowledgment policies specifies that a transmission, included in the OFDMA transmission, from one of the second communication devices, is not to be immediately acknowledged; and the one or more integrated circuits are configured to cause the first communication device to transmit the one or more acknowledgment PHY data units to immediately acknowledge the at least the portion of the uplink OFDMA transmission.

The one or more integrated circuits are configured to cause the first communication device to transmit the one or more acknowledgment PHY data units prior to the first communication device transmitting any other PHY data unit that does not acknowledge any portion of the uplink OFDMA transmission.

The one or more integrated circuits are further configured to: generate an acknowledgment PHY data unit that includes multiple acknowledgment frames in respective component channels.

The one or more integrated circuits are further configured to: generate the acknowledgment PHY data unit to include multiple acknowledgment frames in a single component channel using spatial division multiple access (SDMA).

The one or more integrated circuits are further configured to: generating an acknowledgment PHY data unit that includes a broadcast acknowledgement frame, the broadcast acknowledgment frame indicating respective block acknowledgements for multiple second communication devices.

The broadcast acknowledgement frame is a multi-user block acknowledgement (M-BA) frame.

The one or more integrated circuits are further configured to generate: a first acknowledgment PHY data unit to acknowledge one or more respective transmissions in the uplink OFDMA transmission from a first set of one or more second communication devices; and a second acknowledgment PHY data unit to acknowledge one or more respective transmissions in the uplink OFDMA transmission from a second set of one or more second communication devices.

The one or more integrated circuits are further configured to cause the first communication device to: transmit the first acknowledgment PHY data unit; and after completion of transmitting first OFDMA acknowledgment PHY data unit, transmit the second acknowledgment PHY data unit.

The one or more integrated circuits are further configured to, one of: generate an OFDMA PHY data unit; generate a single user PHY data unit duplicated in a plurality of component channels; or generate a broadcast PHY data unit duplicated in the plurality of component channels.

The network interface device comprises: a plurality of transceivers implemented at least partially on the one or more integrated circuit devices.

The apparatus further comprises a plurality of antennas coupled to the plurality of transceivers.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in/on a computer readable medium or media, such as a RAM, a ROM, a flash memory, memory of a processor, a magnetic disk, an optical disk, a magnetic tape, etc. The software or firmware instructions may include machine readable instructions that, when executed by one or more processors, cause the one or more processors to perform various acts.

When implemented in hardware, the hardware may comprise one or more of discrete components, one or more integrated circuits, one or more application-specific integrated circuits (ASICs), one or more programmable logic devices (PLDs), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for communicating in a wireless communication network, the method comprising:

receiving, at the first communication device, an uplink orthogonal frequency multiple access (OFDMA) transmission, wherein the uplink OFDMA transmission includes respective transmissions from multiple second communication devices, wherein the respective transmissions from the multiple second communication devices include indications of respective acknowledgment policies corresponding to the respective transmissions from the multiple second communication devices;

generating, at the first communication device, one or more acknowledgment physical layer (PHY) data units to acknowledge at least a portion of the uplink OFDMA transmission; and transmitting, with the first communication device, the one or more acknowledgment PHY data units to acknowledge at least the portion of the uplink OFDMA transmission, including:

when one of the acknowledgment policies specifies that one of the transmissions in the uplink OFDMA transmission from one of the second communication devices is to be acknowledged beginning at a predetermined time period after an end of the uplink OFDMA transmission, transmitting, by the first communication device, another PHY data unit, following the reception of the uplink OFDMA transmission, that does not acknowledge the uplink OFDMA transmission prior to transmitting, by the first communication device, the one or more acknowledgment PHY data units.

2. The method of claim 1, wherein generating the one or more acknowledgment PHY data units comprises:

generating a PHY data unit that includes multiple acknowledgment frames in respective component channels.

3. The method of claim 2, wherein generating the one or more acknowledgment PHY data units further comprises:

generating the PHY data unit to include multiple acknowledgment frames in a single component channel using spatial division multiple access (SDMA).

4. The method of claim 2, wherein generating the one or more acknowledgment PHY data units comprises:

generating a PHY data unit that includes a broadcast acknowledgment frame, the broadcast acknowledgment frame indicating respective block acknowledgments for multiple second communication devices.

5. The method of claim 4, wherein the broadcast acknowledgment frame is a multi-user block acknowledgment (M-BA) frame.

6. The method of claim 2, wherein generating the one or more acknowledgment PHY data units comprises generating at least:

a first acknowledgment PHY data unit to acknowledge one or more respective transmissions in the uplink OFDMA transmission from a first set of one or more second communication devices; and a second acknowledgment PHY data unit to acknowledge one or more respective transmissions in the uplink OFDMA transmission from a second set of one or more second communication devices.

7. The method of claim 6, wherein transmitting the one or more acknowledgment PHY data units comprises:
   transmitting the first acknowledgment PHY data unit; and
   after completion of transmitting first acknowledgment PHY data unit, transmitting the second acknowledgment PHY data unit.

8. The method of claim 1, wherein generating the one or more acknowledgment PHY data units comprises one of:
   generating an OFDMA PHY data unit;
   generating a single userPHY data unit duplicated in a plurality of component channels; or
   generating a broadcast PHY data unit duplicated in the plurality of component channels.

9. An apparatus, comprising:
   a network interface device associated with a first communication device, the network interface device having one or more integrated circuits configured to:
      receive an uplink orthogonal frequency multiple access (OFDMA) transmission, wherein the uplink OFDMA transmission includes respective transmissions from multiple second communication devices, wherein the respective transmissions from the multiple second communication devices include indications of respective acknowledgment policies corresponding to the respective transmissions from the multiple second communication devices,
      generate one or more acknowledgment physical layer (PHY) data units to acknowledge at least a portion of the uplink OFDMA transmission, and
      cause the first communication device to transmit the one or more acknowledgment PHY data units to acknowledge at least the portion of the uplink OFDMA transmission;
   wherein the one or more integrated circuits are further configured to:
      when one of the acknowledgment policies specifies that one of the transmissions in the uplink OFDMA transmission from one of the second communication devices is to be acknowledged beginning at a predetermined time period after an end of the uplink OFDMA transmission, transmitting another PHY data unit, following the reception of the uplink OFDMA transmission, that does not acknowledge the uplink OFDMA transmission prior to transmitting the one or more acknowledgment PHY data units.

10. The apparatus of claim 9, wherein the one or more integrated circuits are further configured to:
   generate an acknowledgment PHY data unit that includes multiple acknowledgment frames in respective component channels.

11. The apparatus of claim 10, wherein the one or more integrated circuits are further configured to:
   generate the acknowledgment PHY data unit to include multiple acknowledgment frames in a single component channel using spatial division multiple access (SDMA).

12. The apparatus of claim 10, wherein the one or more integrated circuits are further configured to:
   generating an acknowledgment PHY data unit that includes a broadcast acknowledgment frame, the broadcast acknowledgment frame indicating respective block acknowledgments for multiple second communication devices.

13. The apparatus of claim 12, wherein the broadcast acknowledgment frame is a multi-user block acknowledgment (M-BA) frame.

14. The apparatus of claim 10, wherein the one or more integrated circuits are further configured to generate:
   a first acknowledgment PHY data unit to acknowledge one or more respective transmissions in the uplink OFDMA transmission from a first set of one or more second communication devices; and
   a second acknowledgment PHY data unit to acknowledge one or more respective transmissions in the uplink OFDMA transmission from a second set of one or more second communication devices.

15. The apparatus of claim 14, wherein the one or more integrated circuits are further configured to cause the first communication device to:
   transmit the first acknowledgment PHY data unit; and
   after completion of transmitting first OFDMA acknowledgment PHY data unit, transmit the second acknowledgment PHY data unit.

16. The apparatus of claim 9, wherein the one or more integrated circuits are further configured to, one of:
   generate an OFDMA PHY data unit;
   generate a single userPHY data unit duplicated in a plurality of component channels; or
   generate a broadcast PHY data unit duplicated in the plurality of component channels.

17. The apparatus of claim 9, wherein the network interface device comprises:
   a plurality of transceivers implemented at least partially on the one or more integrated circuit devices.

18. The apparatus of claim 17, further comprising:
   a plurality of antennas coupled to the plurality of transceivers.

* * * * *